July 4, 1950

F. C. WILLIAMS 2,513,537

ELECTRIC INTEGRATOR USING A MOTOR
WITH VELOCITY FEEDBACK

Filed Aug. 7, 1947

2 Sheets-Sheet 1

F. C. Williams
*Inventor*

By *Nelson Moore*

*Attorney*

July 4, 1950

F. C. WILLIAMS 2,513,537

ELECTRIC INTEGRATOR USING A MOTOR
WITH VELOCITY FEEDBACK

Filed Aug. 7, 1947

2 Sheets-Sheet 2

F. C. Williams
*Inventor*

By Nelson Moor
*Attorney*

Patented July 4, 1950

2,513,537

UNITED STATES PATENT OFFICE 2,513,537

ELECTRIC INTEGRATOR USING A MOTOR WITH VELOCITY FEEDBACK

Frederic Calland Williams, Timperley, England

Application August 7, 1947, Serial No. 767,108
In Great Britain July 20, 1945

Section 1, Public Law 690, August 8, 1946
Patent expires July 20, 1965

12 Claims. (Cl. 318—558)

The present invention relates to electrical integrating circuits.

The invention has as its primary object the provision of an electrical integrating circuit of improved characteristics. Other and subordinate objects will appear as this description proceeds.

According to the present invention an integrating circuit comprises, an electric motor, a shaft adapted to be driven by said motor, an amplifier, means for applying the voltage to be integrated to said amplifier, means for applying the electrical output of said amplifier to drive said motor, means for obtaining a feedback voltage proportional to the velocity of said shaft, means for applying said feedback voltage to said amplifier in opposition to the voltage to be integrated, and storage means operative when the motor fails to follow instantaneously variations in the electrical output of said amplifier adapted to vary its electrical energy representative of such failure and later to control said motor whereby the ultimate number of revolutions of said shaft represent the integral of the voltage to be integrated.

The storage means may, for instance, consist of a thermionic valve having a condenser connected between the anode and the control grid, the voltage to be integrated and the feedback voltage being applied to the control grid through high resistances.

In one embodiment of the invention, a split field motor is employed, the field coils of which are connected in the output circuit of a paraphase amplifier and the voltage proportional to the speed of the controlled member is obtained from a generator driven by the motor. Preferably the motor and the generator are constructed so as to form a single unit.

Figure 1:
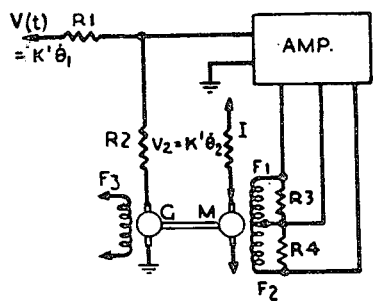
Figure 2:
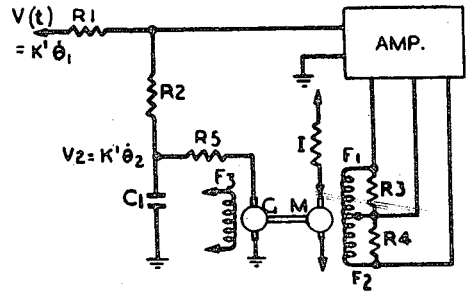
Figure 3:
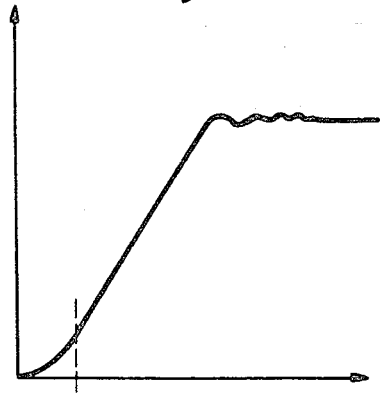
Figure 4:
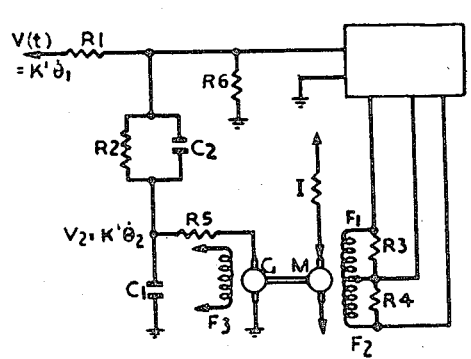
Figure 5:
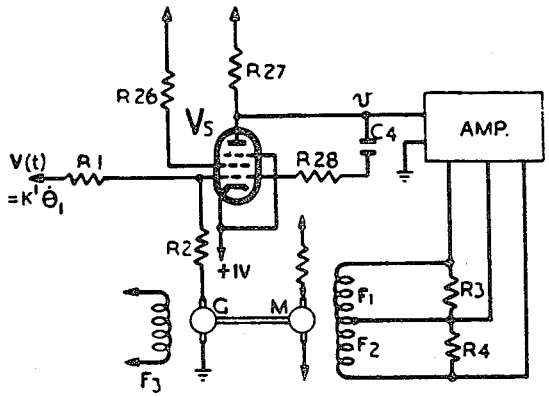
Figure 6:
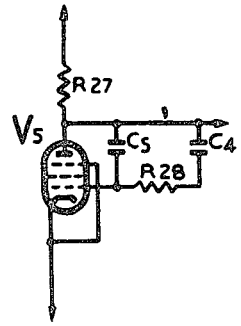
Figure 7:
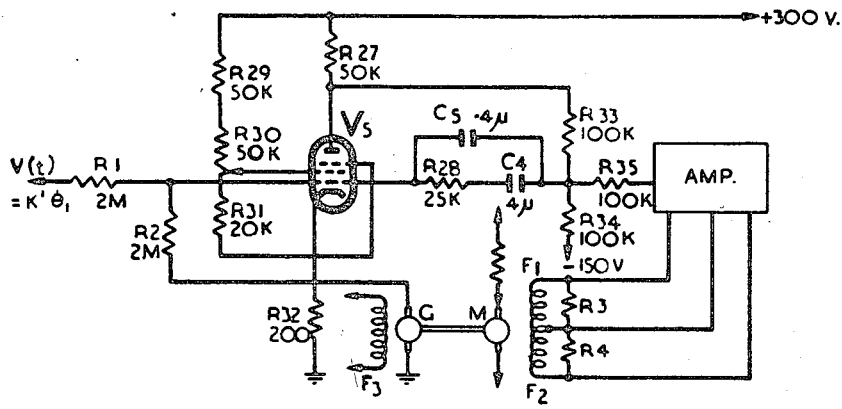
Figure 8:
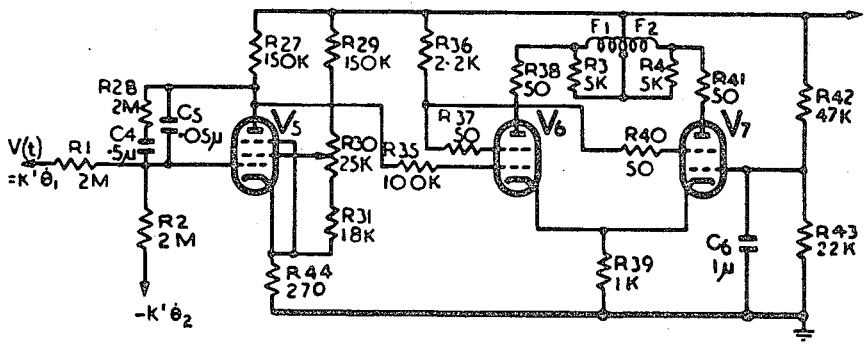

The invention will be better understood from the following description taken in conjunction with the accompanying drawings in which:

Figure 1 shows an arrangement which will be referred to in order to explain the invention, Figure 2 shows an arrangement including a filter circuit in the generator output, Figure 3 shows a typical response curve of the arrangement, Figure 4 shows a heavily damped form of the arrangements shown in Figure 1, Figure 5 shows an integrating arrangement according to the invention, Figure 6 shows the addition to Figure 5 of a filter circuit, Figure 7 shows a particular form of the circuit of Figure 5 while Figure 8 shows another form of the circuit of Figure 5 together with a suitable paraphase amplifier.

Referring first to Figure 1, an input control voltage $V(t)$, is applied through the resistance $R1$ to the input of a high gain paraphase amplifier AMP. The output of the amplifier includes the two field coils $F1$ and $F2$ of a split-field motor M which drives a generator G having a field winding indicated by $F3$ and arranged to deliver an output voltage which is accurately proportional to the speed of the motor. This output is applied through $R2$ to the amplifier input in opposite sense to the voltage $V(t)$.

The mechanism of the control is as follows. If the input control voltage $V(t)$ is zero, the arrangement of the amplifier is such that equal currents flow in the field coils $F1$ and $F2$ so that the magnetic effect of the current in one coil is cancelled by that of the current in the other coil and the motor remains stationary. When the voltage $V(t)$ has some positive or negative value, this balance is disturbed and a resulting magnetic effect is obtained which gives rise to a torque to cause rotation of the motor. The motor armature current $I$ is maintained substantially constant by means not shown so that the torque developed is proportional to field unbalance. As the motor accelerates, the generator output voltage increases and, since this voltage is proportional to the speed of the motor, will eventually become equal to the input control voltage. There will then be no input to the amplifier and no torque will be developed.

For purposes of discussion we will assume that the input voltage is proportional to the speed of a "controlling member."

Representing $\dot{\theta}_1$ as the speed of the controlling member, $\dot{\theta}_2$ as the motor speed both in radians per second and $K^1$ as the voltage generated by the generator per radian/sec., then the generator output voltage $V2 = K^1 \dot{\theta}_2$. If the current delivered by the amplifier is zero when no voltage is applied to the amplifier input, it follows that a given input voltage $V1 = K^1 \dot{\theta}_1$, the motor will accelerate until $$\frac{V2}{R2} = \frac{-V1}{R1}$$

or $$\dot{\theta}_2 = \frac{-R2}{R1} \dot{\theta}_1 = \frac{-R2}{R1} \frac{V1}{K1} \quad (1)$$

The relation holds as follows: it has been said that:

$$V2 = K^1 . \dot{\theta}_2$$

It has also been said that:

$$V1 = K^1 . \dot{\theta}_1$$

Thus substituting the values of V1 and V2 in the equation:

$$\frac{V2}{R2} = \frac{V1}{R1}$$

the following result is obtained:

$$\frac{K^1\theta_2}{R2} = \frac{K^1\theta_1}{R1}$$

Thus $$\theta_2 = \frac{R2}{R1} \cdot \theta_1$$

In the above equations, "R1" is the resistance through which the input control voltage V(t) is applied to the amplifier, and "R2" is the resistance through which the feedback voltage V2 is applied to the amplifier. This simple relation between $\theta_1$ and $\theta_2$ does not completely explain the operation of the arrangement in practice but before considering the operation in greater detail, it should be noted that by integrating both sides of Equation 1 between the limits 0 to $t$, $$[\theta_2]_t - [\theta_2]_0 = -\frac{R2}{R1.K^1}\int_0^t V.dt$$

Now $[\theta_2]_t - [\theta_2]_0$ is the number of revolutions made by the motor shaft in the time $t$ and is thus a measure of the integral of the input control voltage V1 over the time $t$. The arrangement may therefore be employed as an integrating device and has obvious application to computing equipment, the quantity to be integrated being represented by a voltage.

A more exact relation between $\theta_1$ and $\theta_2$ is given by the expression $$\theta_2 = \frac{-R2}{R1} \cdot \theta_1 / T + pt \qquad (2)$$

where $$\frac{1}{T} + GKK^1 \cdot \frac{R1}{R1 + R2}$$

G = the gain of the amplifier expressed as change in current (ma.) in each field coil per volt change in input, K = the acceleration of the motor in radians/sec.² per ma. change in current in each field coil from the balanced condition and $$\frac{1}{p} = \int \ldots dt$$

$p$ being the Heaviside operator.

From Equation 2 it will be seen that the relation between $\theta_1$ and $\theta_2$ is non-oscillatory.

It will be obvious from a consideration of Figure 1 that a strict analysis of the arrangement must take into account the time taken for the current to build up in the motor field in response to a change in speed demand voltage. It is also necessary to protect the field coils against high currents by the insertion of the shunt-resistances R3 and R4, and these resistances will increase the build-up time constant. It has been found in certain practical cases that a value of 5000 ohms for each resistance provides sufficient protection without unduly increasing the build-up time constant. This time constant will be denoted by $Tf$. There is also another factor which must be taken into account. With high-gain amplifiers, a spurious magnetic coupling which exists between the motor field and the generator armature may lead to audio-frequency oscillation. This possibility is minimised by the introduction of a simple filter circuit between the output of the generator and the input to the amplifier. The circuit shown in Figure 2 where the filter circuit comprises the resistance R5 and the condenser C1 where R5 is very much smaller than R2. This filter circuit introduces a further delay given by the time constant of the filter R5 C1. This time constant will be indicated by $Td$.

It can be shown mathematically that, taking into account these additional factors, the relation between the demanded speed $\theta_1$ and the motor speed $\theta_2$ in radians per second is given by the following equation:

$$\left[p^2 + \frac{W^1v}{\alpha^1} \cdot p + \frac{W^{1}v^2}{1 + p \cdot \frac{\alpha^1\phi^1}{W^1v}}\right]\theta_2 = \frac{W^{1}v^2}{1 + p \cdot \frac{\alpha^1\phi^1}{W^1v}} \cdot \theta_1 \qquad (3)$$

From the form of Equation 3 it will be seen that, in response to unit function of the demanded speed, the motor speed will oscillate about the required value with a frequency which is determined by the constants of the circuit. Writing $$W_v = \sqrt{\frac{GKK^1}{2Tf}} = 2\pi \times \text{natural period of velocity oscillations of the arrangement}$$

$Tf.W_v = \alpha$ as the damping constant, and $\frac{Td}{Tf} = \phi$ as the ratio of the time constant of the filter circuit to the field damping time constant (this must always be less than 1 or $Tf$ and $Td$ are interchanged) Equation 3 becomes:

$$\left[p^2 + \frac{W_v}{\alpha}p + \frac{W_v^2}{1 + p \cdot \frac{\alpha\phi}{W_v}}\right]\theta_2 = W_v^2\theta_1 \qquad (4)$$

One type of motor generator which has been used in the arrangement according to the invention requires a 24 volt supply for the generator field coil and motor armature winding and develops a torque on the motor shaft of 1000 to 1500 gm. cm. at speeds up to 6000 R. P. M. The maximum acceleration is 9500 R. P. M./second and the maximum deceleration is 13000 R. P. M./second while the value of $K^1$ is 0.4 volt/radians/second and of K is 12 radians/second²/ma. The gain of the amplifier, G, is 400 ma. per volt, the circuit being such as to produce full field unbalance in either direction for, say, ±0.1 volt input relative to earth. The necessary generator output voltage to produce this input voltage is approximately ±0.2 volt and since the generator is arranged to produce 70 volts at 2000 R. P. M., the speed change necessary to vary the torque from zero to the full value is only $$0.2 \times \frac{2000}{70}$$

or approximately 6 R. P. M. and is independent of the speed. It is possible to achieve smooth speeds as low as 6 R. P. M. since even full torque will not stall the machine at speeds above 6 R. P. M. Since the maximum speed is 6000 R. P. M., a controlled speed range of 1000 to 1 is available to an accuracy of 6 R. P. M. One final constant requires consideration and that is the field damping time constant. Using two 5000 ohm resistances for protective purposes, a time constant of 0.01 second is obtained. Hence with this particular type of motor generator, $$W_v = \sqrt{9600}$$

or approximate 300, giving $fv$, the frequency of oscillation, as approximately 50 cycles per second, $$a = Tf.Wv = 3$$

The value of $a$ for critical damping is ½ so that it will be seen that the system is underdamped. The relation between $\theta_1$ and $\theta_2$ has been investigated experimentally for values of $a$ of 1, 4 and 10 and it has been found that with $a=4$ or greater, values of $\phi$ as low as 0.1 produce maintained oscillations. With $a=1$, $\phi<1$ is acceptable while with $Td=0$, i. e. without the filter circuit, $a$ should be less than 4.

It should be noted that the linear regime of the arrangement described is only within approximately ±6 R. P. M. from the wanted speed so that several cycles of oscillation can be tolerated. When large unit functions are applied, the system will be overloaded and the motor will accelerate at its maximum value until it reaches a value within 6 R. P. M. of the demanded speed. A small transient oscillation approximately corresponding to the linear response to a unit function of 6 R. P. M. then occurs the complete response curve being as shown in Figure 3 in which speed is the ordinate and time the abscissa. The shape of the curve during the field build up time (from zero to the dotted line) will be approximately parabolic and will occupy a time of approximately LI max/E max where L is the field inductance, I max is the maximum field current change and E max is the maximum voltage change across the field. These quantities will depend on the amplifier employed.

If a more heavily damped response is desired corresponding with $a=1$, for example, the gain of the amplifier may be reduced. Thus division of the gain by 9 gives $fv=17$ cycles per second but for the application of full torque a speed change of 54 R. P. M. is now required. An alternative and preferable method of obtaining stability is to employ the circuit shown in Figure 4 where $R1=R2=nR6$, where $n$ is equal to $R1/R6$ or $R2/R6$ and has been introduced for convenience only to show the value of the ratio of resistance $R1$ and $R6$ on the damping of the system. Further if $R5 \ll R1$ and the time constant of R2 and C2 is made equal to the field time constant $Tf$, the equation between $\theta_1$ and $\theta_2$ becomes:

$$\left[p^2 + \frac{(n+2)}{Tf} \cdot p + \frac{GKK^1}{Tf(1+p.Td)}\right]\theta_2 = \frac{GKK^1}{Tf} \cdot \frac{1}{1+pTf} \theta_1$$

Writing $$W^1_v = \sqrt{\frac{GKK^1}{Tf}}$$

$$\frac{TfW^1_v}{n+2} = a^1$$

and $$\frac{Td(n+2)}{Tf} = \phi^1$$

the equation becomes $$\left[p^2 + \frac{W^1_v}{a^1} \cdot p + \frac{W^{12}_v}{1+p \cdot \frac{a^1\phi^1}{W^1_v}}\right]\theta_2 = \frac{W^{12}_v}{1+p \cdot \frac{a^1\phi}{W^1_v}} \cdot \theta_1 \quad (5)$$

Comparing Equation 5 with Equation 4, it will be seen that $Wv$, while it is independent of $n$, is increased by $$\sqrt{2}$$

i. e. the response frequency has been increased, and $\phi$, the damping term, has increased by $(n+2)$. The damping constant has therefore decreased by $$\frac{\sqrt{2}}{n+2}$$

and if, for example, $n=2$, $$a^1 = \frac{3\sqrt{2}}{4}$$

or approximately 1. With this degree of damping, the value of $Td$ of 1 millisecond is innocuous since $$\phi^1 = \frac{Td.W^1_v}{a^1} = 0.28$$

only. The steady state gain can be shown to have been reduced by $$\frac{2}{n+2}$$

i. e. ½ for $n=2$. Heavy damping has thus been obtained at a cost of only doubling the speed change necessary for application of full torque i. e. from 6 R. P. M. to 12 R. P. M.

It will be understood that the action of the arrangement whether used for automatic following, integration and so on will be more accurate the higher the gain of the amplifier. Increase in the gain of the amplifier, however, introduces difficulties in that the small but inevitable magnetic coupling between the motor field and generator armature gives rise to audio-frequency oscillations round the circuit, and, further, overloading of the amplifier may occur. The last-mentioned difficulty is particularly serious in the case where the arrangement is employed as an integrator in computing mechanisms, since true integration can only be obtained if the amplifier operates linearly and so takes a true average of the generator voltage. In order to avoid these difficulties the paraphase amplifier is preceded by a single valve circuit giving an arrangement according to the invention shown in Figure 5.

The input voltage to be integrated and the generator output voltage are fed through equal resistances R1 and R2 respectively to the control grid of a thermionic valve V5, the cathode of which is maintained at approximately +1 volt. The screen voltage of the valve is varied until the anode voltage i. e. the input to the paraphase amplifier AMP, is such that no torque is exerted when the control grid of V5 is at earth potential. It then follows that when the output of the generator, $K^1\theta_2$, is equal and opposite to the input control voltage, $K^1\theta_1$, there is no torque. If $\theta_2$ falls below the demanded value, torque is applied to accelerate the motor and increase $\theta_2$ until there is zero speed error. Assuming the gain of the valve is infinite and that the control grid potential does not vary from zero, then the resultant current entering the grid is given by $$K_1 \frac{(\theta_1 - \theta_2)}{R}$$

where R is the value of each of R1 and R2. Further, assuming no grid current flows, this current must be balanced by current flow through C4 and R28 from the anode. Hence $$K \frac{(\theta_1 - \theta_2)}{R} = \frac{v}{R^1 + \frac{1}{p.C}}$$

where $R^1$ is the value of R28 and C is the value of C4. Hence $v$, the anode voltage of V5 is given by:

$$v = \left(\frac{R^1}{R} + \frac{1}{p.RC}\right) K^1(\theta_1 - \theta_2)$$

Thus $v$ comprises a direct misalignment term $$\frac{R^1}{R} \cdot K^1(\theta_1 - \theta_2)$$

and an integrated misalignment terms $$\frac{1}{p.CR} K^1(\theta_1 - \theta_2)$$

If the gain of the amplifier is G milliamperes of field current per volt of input $v$, and if the field time constant is $Tf$, the resulting field current is:

$$i_f = \frac{Gv}{1 + p.Tf}$$

and if the motor is such that the acceleration is K radians/(sec.)$^2$ per field ma., then $$p.\dot{\theta}_2 = K.i_f = \frac{KGK^1}{1 + p.Tf}\left[\frac{R^1}{R} + \frac{1}{p.RC}\right](\theta_1 - \theta_2)$$

or $$p^2.\ddot{\theta}_2 = \frac{KGK^1}{RC}\left[\frac{1 + pR^1C}{1 + pTf}\right](\theta_1 - \theta_2) \quad (6)$$

Consideration of this equation shows that the response to unit function of demanded speed will again be oscillatory, the frequency of oscillation being given by $$2\pi f_v = W_v = \sqrt{\frac{GKK^1}{RC}}$$

The system is critically damped for $R^1CW_v = 2$ and oscillation introduced by the field time constant $Tf$ is small if $TfW_v < 0.4$. In the practical circuit employed, a condenser C5 (Figure 6) is connected across C4 and R28 in order to smooth out any generator ripple in the voltage $v$. The equation, corresponding to Equation 4, now becomes:

$$p^2.\ddot{\theta}_2 =$$

$$\frac{KGK^1}{R(C+C^1)} \cdot \frac{1 + p.R^1C}{(1 + p.Tf)\left(1 + p.\frac{C^1}{C+C^1}.R^1C\right)}(\theta_1 - \theta_2)$$

where $C^1$ is the value of the condenser C5. The natural frequency of oscillation of the system is now given by, $$2\pi f_v = W_v = \sqrt{\frac{KGK^1}{R(C+C^1)}}$$

Referring again to Figure 5, suppose the voltage $V(t)$ is zero and the motor stationary. Now let the voltage $V(t)$ vary in such a manner that overloading does not occur i. e. such that $v$ remains within the limits of anode voltage swing determined by the value of the H. T. supply and by the value of $v$ at which grid current flows. At time $t$ let $V(t)$ be returned to zero when the motor will again become stationary and $v$ must have returned to its original value. Then on the supposition of infinite gain, the control grid has remained at earth throughout the period and no flow of grid current has taken place. Hence the resultant change in charge stored in C4 or in C4 and C5 is the resultant change of current which has flowed into the grid from $V(t)$ and $K^1\dot{\theta}_2$ through the resistances R1 and R2. But, since $v$ is unchanged, there has been no change in charge and hence:

$$\int_0^t \frac{V - K^1\dot{\theta}_2}{R} \cdot dt = 0$$

or $$K^1 \int_0^t \dot{\theta}_2 dt = \int_0^t V.dt$$

Hence $$[\theta_2]_t - [\theta_2]_0 = \frac{1}{K^1}\int_0^t V.dt$$

That is, the number of rotations made by the output shaft is a measure of the integral of V or $V(t)$ from 0 to $t$. This result has been deduced without reference to instantaneous equality between V and $K^1\dot{\theta}_2$ and it follows that, under the conditions stated above, the final position of the output shaft is the required integral irrespective of the ability of the motor to follow instantaneously the variations of V, provided only that the valve V5 is not overloaded. Overloading in later stages is not of importance. Physically this result is brought about by the ability of C4 or C4 and C5 to "remember" any failure of the motor to follow the speed demand voltage due, for instance, to demand for an acceleration outside its capabilities, and to ensure that such errors are made good later. Thus at the conclusion of the performance of the hypothetical integration described above, the motor will not stop immediately the voltage V or $V(t)$ is returned to zero but will continue rotating to remove any error "remembered" as charge on C4 or C4 and C5. The time taken for this correction is given approximately by the reciprocal of the natural frequency of the system.

The error in the output of the integrator at any instant during the integration is the amount of excess charge in C4 or C4 and C5 and is, therefore, reducible in two ways:

(1) By reducing the variations of $v$ to a minimum
(2) By keeping C4 or C4 and C5 small The first condition is met by employing a paraphase amplifier with considerable gain so that small changes of $v$ produce maximum torque, it being remembered that overloading in this part of the equipment is irrelevant. The second condition is met by reducing the condensers to the smallest values consistent with adequate damping of the system for if the integrator is underdamped serious errors will result if the voltage $V(t)$ contains components approaching the natural frequency of the system. It is also obvious that both conditions imply that $w_v$ should be kept high for the best results. However the maximum value of $w_v$ which can be obtained, it can be shown that $$\frac{G}{C + C^1}$$

is a constant and hence any increase of G to satisfy the first condition will involve a corresponding increase of C4 and C5 in contravention of the second condition. Considering the possibility of V5 being overloaded, it is apparent that this will be reduced to a minimum by making C4 and C5 large with a compensating increase in G to maintain $W_v$ at the maximum value consistent with proper damping. Further it is advantageous to increase C4 and C5 even beyond those values which eliminate overloading of V5 for it has been assumed that the gain of V5 is infinite in order that the grid should remain always at earth potential. It is apparent that with finite gain this will be more nearly true the greater C4, C5 and G. Hence the highest convenient value of G is selected and C4 and C5 are chosen to give the maximum value of $W_v$.

With the values of K, $K^1$, G and $T_f$ given previously, it can be shown that the time constant of C4 and R28 should be 0.1 second, the time constant of C4+C5 and R1 should be 7.2 seconds and that C5=0.1×C4 i. e. $C^1$=0.1C. A circuit which satisfies these conditions is shown in Figure 7, the valve V5 being a Mullard EF50. The resistances R33 and R34 are employed to bring the value of $v$ down to earth for zero input control voltage and have an effect on the overload limits of $v$. The resistance R35 is introduced to isolate $v$ from the effects of grid current in the paraphase amplifier.

This circuit provides a very high degree of protection against overloading. Thus in the worst possible case of unit function demand for full speed, the voltage V($t$) is approximately 200 and full torque will be applied substantially immediately by overloading the paraphase amplifier. This condition will remain in force for about 0.5 second with the output speed rising linearly to peak acceleration. During this interval the excess charge to be stored in C4 and C5 is $$\int_0^t \left(\frac{V}{R} - \frac{K^1\dot{\theta}_2}{R}\right) \cdot dt$$

Now, $\dot{\theta}_2 = b.t$ where $b$ is the maximum acceleration. Hence the charge is given by $$\frac{Vt}{R} - \frac{K^1 bt^2}{2R}$$

and by substituting the appropriate values, the charge will be found to be 27 micro-coulombs. This charge produces a value of $v$ of about 6 volts at the end of the .5 second interval and, since the total voltage swing of $v$ for no overload on V5 is approximately ±50 volts, it will be seen that there is an ample margin of safety. The gain of the stage is about 75 so that the change in grid potential, which was assumed to be zero in the above analysis, will be 0.1 volt, which is negligible compared with the 200 volt input voltage required to produce it. For linear operation of the paraphase amplifier, the limits of $v$ are ±.075 volt so that, in this case, the assumption of zero voltage change of the control grid of V5 is fulfilled to within ±.001 volt. The speed range of the apparatus is 20,000 to 1.

In a large number of cases these limits are too generous and the simpler-circuit shown in Figure 8 may be employed. In this diagram the motor generator has been omitted but the circuit of the paraphase amplifier comprising the valves V6 and V7 has been included. Any overloading of the paraphase amplifier which may take place is limited by the valve V5. For the circuit shown in Figure 8, G=4 ma./volt and the circuit will handle a unit function input of 50 volts instead of the 200 volts of Figure 7. The peak change in the value of $v$ will now be approximately 100 volts and, the gain of the first stage being 200, the grid change is .5 volt for a 50 volt unit function. The speed range for good integration with this circuit is 270 to 1 although the actual speed range available is 10,000 to 1.

The inevitable coupling between the motor field and generator armature is innocuous in either of the circuits shown in Figures 7 and 8 since the overall gain even at 10 cycles per second is very heavily reduced by C4, C5 and R28 and it is found, in practice, the audio oscillation is not produced.

With regard to the ripple component in the value, this balance is disturbed and a resulting separately as a spurious input. In this case however $\dot{\theta}_2$, the number of revolutions of the motor shaft, together with the residual charge on C4 and C5 will now represent the integral of V($t$) and the integral of the ripple. The integral of the ripple is zero over any multiple of $2\pi$ so that it follows that small ripples can only produce very small errors. If the random component of ripple, due to brush resistance and wear causing uneven commutation, is neglected, the magnitude of the error can be determined. It can be shown, for instance, that a 10 per cent sinusoidal ripple of frequency $$\frac{nW}{2\pi}$$

would introduce an error of 5.7 degrees of rotation of the motor shaft in the worst case where $n=1$. Such an error is well within the limits of accuracy of the system as a whole.

I claim:

1. An integrating circuit comprising, an electric motor, a shaft adapted to be driven by said motor, an amplifier, means for applying the voltage to be integrated to said amplifier, means for applying the electrical output of said amplifier to said motor to control the velocity thereof, means for obtaining a voltage proportional to the velocity of said shaft, means for applying said voltage proportional to the velocity of said shaft to said amplifier in opposition to the voltage to be integrated, and storage means operative to be charged with electrical energy when the motor fails to follow instantaneously variations in the electrical output of said amplifier, said storage means including means adapted to change its store of electrical energy representative of such failure and later to drive said motor in accordance with the extent that its store of energy changed.

2. An integrating circuit comprising, an electric motor, a shaft adapted to be driven by said motor, an amplifier, means for applying the electrical output of said amplifier to said motor to control the velocity thereof, a storage circuit, means for applying the electrical output of said storage circuit to said amplifier, means for applying the voltage to be integrated to said storage circuit, means for obtaining a feedback voltage proportional to the velocity of said shaft, means for applying said feedback voltage to said storage circuit in opposition to the voltage to be integrated, electrical storage means included in said storage circuit and comprising means to change its store of electrical energy in quantity representative of that energy fed to the motor which fails to cause rotation of the motor, and means responsive to the extent that the store of charge changed for applying energy proportional to said change through said amplifier to drive said motor.

3. An integrating circuit comprising, an electric motor, a shaft adapted to be driven by said motor, an electric generator adapted to be driven by said motor, an electron discharge device having an input electrode and an output electrode, a connection including a condenser connected between said input electrode and said output electrode, means for applying the voltage to be integrated to said input electrode, means for applying the output voltage of said electric generator to said input electrode in opposition to the voltage to be integrated, an amplifier, means for applying the voltage at the output electrode of said valve to said amplifier, and means for applying the electrical output of said amplifier to said motor to control the velocity thereof, whereby the number of revolutions of said shaft represents the integral of the voltage to be integrated.

4. An integrating circuit comprising, an electric motor, a shaft adapted to be driven by said motor, an electron discharge device having a cathode, a control grid and an anode, a capacitative feedback circuit between said control grid and said anode, means for applying the voltage to be integrated to said control grid, an amplifier, means for applying the output voltage at said anode to said amplifier, means for applying the electrical output of said amplifier to said motor to control the velocity thereof, means for obtaining a voltage proportional to the velocity of said shaft, and means for applying said voltage proportional to the velocity of said shaft to said control grid in opposition to the voltage to be integrated, whereby the number of revolutions of said shaft represents the integral of the voltage to be integrated.

5. An integrating circuit comprising an electric motor, a shaft adapted to be driven by said motor, an electron discharge device having a cathode, a control grid and an anode, a condenser, a resistor in series with said condenser and the two connected between said control grid and said anode, an amplifier, means for applying the output voltage at said anode to said amplifier, means for applying the electrical output of said amplifier to said motor to control the velocity thereof, means for obtaining a voltage proportional to the velocity of said shaft, an input resistor for applying the voltage to be integrated to said control grid, a third resistor and means for applying said voltage proportional to the velocity of said shaft through said third resistor to said control grid in opposition to the voltage to be integrated, whereby the number of revolutions of said shaft represents the integral of the voltage to be integrated.

6. An integrating circuit according to claim 4 and including a second condenser connected in parallel with said resistance and condenser.

7. An integrating circuit comprising, an electric motor, a shaft adapted to be driven by said motor, an electric generator adapted to be driven by said motor, an electronic valve having a cathode, a control grid and an anode, a capacitative feedback circuit between said control grid and said anode, means for applying the voltage to be integrated to said control grid, a filter circuit, means for applying the output voltage of said generator through said filter circuit to said control grid in opposition to the voltage to be integrated, an amplifier, means for applying the output voltage at said anode to said amplifier, and means for applying the electrical output of said amplifier to said motor to control the velocity thereof, whereby the number of revolutions of said shaft represents the integral of the voltage to be integrated.

8. An integrating circuit comprising a split field electric motor having two field coils, a shaft adapted to be driven by said motor, an electric generator adapted to be driven by said motor, an electronic valve having a cathode, a control grid and an anode, a capacitive feedback circuit between said control grid and said anode, means for applying the voltage to be integrated to said control grid, means for applying the output voltage of said generator to said control grid in opposition to the voltage to be integrated, a paraphase amplifier, and means for applying the respective paraphase electrical outputs of said amplifier to the field coils of said motor to control the velocity thereof, whereby the number of revolutions of said shaft represents the integral of the voltage to be integrated.

9. An integrating circuit according to claim 7 and including a resistance connected across each of said field coils in order to protect the windings against high currents.

10. An integrating circuit comprising, a split field electric motor having two field coils, a shaft adapted to be driven by said motor, an electric generator adapted to be driven by said motor, an electronic valve having a cathode, a control grid and an anode, a condenser, a resistance in series with said condenser and the two connected between said control grid and said anode, a second resistance, means for applying the voltage to be integrated through said second resistance to said control grid, a third resistance, means for applying the output voltage of said generator through said third resistance to said control grid in opposition to the voltage to be integrated, a paraphase amplifier, means for applying the output voltage at said anode to said amplifier, and means for applying the respective paraphase electrical output of said amplifier to the field coils of said motor to control the velocity thereof, whereby the number of revolutions of said shaft represents the integral of the voltage to be integrated.

11. An electrical integrating circuit comprising a rotating electrical machine having an input and an output, said machine including a driving element connected to said input and a generating winding connected to said output, a main input for receiving the energy to be integrated, a circuit responsive to the potential difference between said main input and the said output for energizing said first-named input, a reactor connected to said output and to said main input for building a charge the magnitude of which varies with the potential difference between said output and said main input, and means including said reactor and connected to the first-named input to control the latter by the variation in the charge of the reactor.

12. The circuit of claim 1 in which the storage means includes a capacitor connected to be charged to an extent representative of said failure, said storage means also including means controlled by the discharge thereof for applying a voltage to said amplifier representative of such discharge and additive in polarity to the effect of the input voltage.

FREDERIC CALLAND WILLIAMS.

REFERENCES CITED

The following references are of record in the file of this patent:

UNITED STATES PATENTS

| Number | Name | Date |
|---|---|---|
| 1,717,191 | Cremer | June 11, 1929 |
| 2,113,436 | Williams | Apr. 5, 1938 |
| 2,115,086 | Riggs | Apr. 26, 1938 |
| 2,414,430 | Nisbet | Jan. 14, 1947 |